(12) United States Patent
Herzhauser et al.

(10) Patent No.: US 9,796,387 B2
(45) Date of Patent: Oct. 24, 2017

(54) METHOD AND DEVICE FOR OPERATING A VEHICLE

(71) Applicant: Robert Bosch GmbH, Stuttgart (DE)

(72) Inventors: Erik Herzhauser, Bad Rappenau-Heinsheim (DE); Marcel Dorn, Ilsfeld (DE); Ingo Fecht, Ludwigsburg (DE); Adrian Thomys, Murr (DE); Sebastian Auracher, Moeglingen (DE); Sven Klostermann, Kuenzelsau-Gaisbach (DE); Karim Badawy, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/023,453

(22) PCT Filed: Jul. 28, 2014

(86) PCT No.: PCT/EP2014/066155
§ 371 (c)(1),
(2) Date: Mar. 21, 2016

(87) PCT Pub. No.: WO2015/043798
PCT Pub. Date: Apr. 2, 2015

(65) Prior Publication Data
US 2016/0214613 A1    Jul. 28, 2016

(30) Foreign Application Priority Data

Sep. 26, 2013  (DE) .................. 10 2013 219 457

(51) Int. Cl.
*B60W 30/18* (2012.01)
*B60W 10/06* (2006.01)
(Continued)

(52) U.S. Cl.
CPC ...... *B60W 30/18163* (2013.01); *B60W 10/06* (2013.01); *B60W 10/08* (2013.01);
(Continued)

(58) Field of Classification Search
CPC .............................................. B60W 30/18163
(Continued)

(56) References Cited

U.S. PATENT DOCUMENTS 9,688,278 B2 *   6/2017   Harda ............. B60W 30/18163
2007/0162200 A1  7/2007   Zillmer et al.
(Continued)

FOREIGN PATENT DOCUMENTS

DE   102005047940   4/2007
DE   102007054453   5/2009
(Continued)

OTHER PUBLICATIONS

International Search Report for Application No. PCT/EP2014/066155 dated Oct. 21, 2014 (English Translation, 2 pages).

*Primary Examiner* — Krishnan Ramesh
(74) *Attorney, Agent, or Firm* — Michael Best & Friedrich LLP

(57) ABSTRACT

The invention relates to a method for operating a vehicle with a drive device (20) which has at least one internal combustion engine (21) as a drive machine, wherein a drive torque requested by a driver of the vehicle (1) is implemented by operating at least the internal combustion engine (21) on a roadway (2), comprising the following steps: a) Monitoring the roadway (2) for road users (3) travelling ahead, by means of a surroundings sensor system (5), b) Monitoring a driver of the vehicle (1) by means of a state sensor system (8) with respect to his request to carry out an overtaking process in order to overtake a detected road user (3) travelling ahead, and if a request to carry out an
(Continued)

overtaking process has been detected, c) Actuating the drive device (20) to prepare the overtaking process in such a way that before the overtaking process is carried out a torque reserve of the internal combustion engine (21) is built up.

12 Claims, 1 Drawing Sheet

(51) Int. Cl.
| | |
|---|---|
| *B60W 10/08* | (2006.01) |
| *F02D 41/02* | (2006.01) |
| *B60W 20/10* | (2016.01) |
| *B60W 20/12* | (2016.01) |
| *F02D 37/02* | (2006.01) |
| *F02D 41/14* | (2006.01) |

(52) U.S. Cl.
CPC ............ *B60W 20/10* (2013.01); *B60W 20/12* (2016.01); *F02D 41/021* (2013.01); *B60W 2540/00* (2013.01); *B60W 2550/14* (2013.01); *B60W 2710/0666* (2013.01); *F02D 37/02* (2013.01); *F02D 2041/1412* (2013.01); *F02D 2200/60* (2013.01); *F02D 2200/701* (2013.01); *F02D 2200/702* (2013.01); *F02D 2250/22* (2013.01); *Y10S 903/93* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2012/0078484 A1* | 3/2012 | Kato | .................... | B60W 30/143 |
| | | | | 701/96 |
| 2014/0136040 A1* | 5/2014 | Scholz | .................. | B60W 10/06 |
| | | | | 701/22 |
| 2015/0266486 A1* | 9/2015 | Silvlin | .................. | B60W 40/09 |
| | | | | 701/70 |
| 2015/0344033 A1* | 12/2015 | Fukuda | .................. | B60W 30/16 |
| | | | | 701/117 |
| 2015/0353094 A1* | 12/2015 | Harda | ............. | B60W 30/18163 |
| | | | | 701/23 |
| 2016/0121893 A1* | 5/2016 | Ask | ........................ | B60W 30/16 |
| | | | | 701/96 |

FOREIGN PATENT DOCUMENTS

| | | |
|---|---|---|
| DE | 102011118336 | 6/2012 |
| EP | 0728612 | 8/1996 |
| EP | 2479077 | 7/2012 |

\* cited by examiner

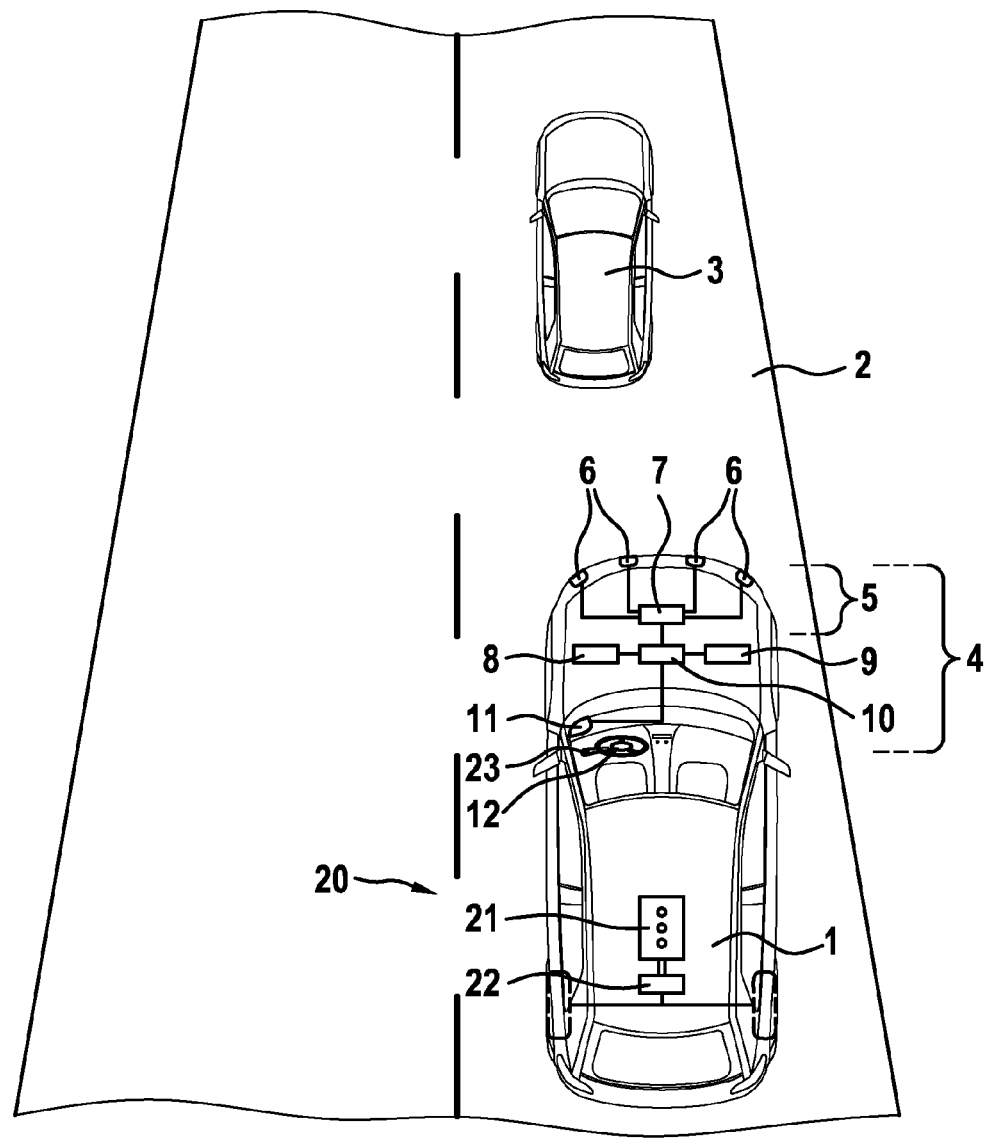

METHOD AND DEVICE FOR OPERATING A VEHICLE

BACKGROUND OF THE INVENTION

The invention relates to a method for operating a vehicle with a drive device which has at least one internal combustion engine as a drive machine, wherein a drive torque requested by a driver of the vehicle is implemented by operating at least the internal combustion engine on a roadway.

In addition, the invention relates to a device for carrying out the method described above.

The drive devices described above are known from the prior art. Conventional drive devices comprise an internal combustion engine, which is embodied as a gasoline engine or as a diesel engine. Such internal combustion engines, in particular if they are equipped with a turbocharger, require a little time before a requested torque is provided. Particularly the so-called turbo lag frequently leads to a noticeable delay between requesting a torque by actuating a gas pedal and the torque actually transmitted to the drive wheels by the internal combustion engine. Important time is thereby lost in particular when initiating an overtaking process, said time being necessary or at least advantageous for carrying out the overtaking process in a timely manner.

So-called hybrid drive devices also have at least one electric machine, which can be operated as a generator or as a motor, in addition to an internal combustion engine in order to implement a desired torque on a roadway. A drive torque of the vehicle therefore consists collectively of the torques of the internal combustion engine and of the electric machine, provided said torques are operatively connected to each other directly or, for example, by means of a transmission. In order to regenerate or, respectively, charge an electrical energy storage of such drive devices, the electric machine is regularly switched into a generator mode; and the negative torque exerted thereby on the drive train is balanced or compensated by an additional positive torque of the internal combustion engine so that the driving operation of the vehicle is not impaired by the charging of the energy storage.

SUMMARY OF THE INVENTION

The method according to the invention has the advantage that, prior to carrying out an overtaking process with the vehicle, the drive device is brought into a state in which the internal combustion engine already provides a requested torque upon initiation of the overtaking process.

To this end, provision is made according to the invention for the roadway to be monitored initially in step a) for road users travelling ahead by means of a surroundings sensor system. If a road user travelling ahead is detected, the driver of the vehicle is monitored in step b) with respect to his/her request to carry out an overtaking process in order to overtake the road user travelling ahead. If a request for carrying out an overtaking process has been detected in step b), the drive device is then actuated in step e) to prepare the overtaking process in such a way that, prior to carrying out the overtaking process, a torque reserve of the internal combustion engine is built up, in particular while maintaining a current rotational speed. Provision is therefore made for a request for carrying out an overtaking process to initially be automatically detected and for the drive device to be transferred into a state which provides a highest possible torque of the internal combustion engine upon initiation of the overtaking process. It is possible in modern internal combustion engines to build up a torque reserve when the rotational speed of the engine remains constant. The torque reserve allows the internal combustion engine to be prepared for a sudden respectively fast call-up of a high or, respectively, higher torque, wherein, in accomplishing this end, poor degrees of efficiency have to be temporarily accepted. In internal combustion engines which are operated with gasoline, a torque reserve can, for example, be set by retarding the ignition angle. This torque reserve can be accessed in the shortest amount of time upon initiation of the overtaking process as a result of a change in the ignition angle. In diesel engines, an injection time is preferably retarded in order to achieve the same effect. It is thus possible in a simple manner to preload the internal combustion engine and to access this preload as needed in the shortest amount of time as a result of changing the injection time.

According to a preferred modification to the invention, provision is made, in the event that the drive device has at least one electric machine which is operatively connected to the internal combustion engine and is used as a further drive machine, for the electric machine to be switched into a generator mode in order to build up the torque reserve and for the torque of the internal combustion engine to be increased in order to maintain the requested drive torque prior to carrying out the overtaking process. The electric machine therefore counteracts the increased torque of the internal combustion engine so that the rotational speed of the internal combustion engine is maintained while the torque of said internal combustion engine can be greatly increased. The drive device is thus switched into a charged or, respectively, preloaded operation of the internal combustion engine in which said internal combustion engine already provides a higher torque, which is, however, compensated by the generator operation of the electric machine. As a result, the original drive torque is maintained in the aggregate. If the driver then initiates the overtaking process, the full respectively high torque of the internal combustion engine is immediately available to him in order to carry out the overtaking process. Particularly in contrast to drive devices which only have an internal combustion engine at their disposal which only provides a higher torque with a time delay, the method according to the invention ensures that the higher torque is immediately made available; thus enabling the driver to accelerate quickly during an overtaking process and to safely complete said overtaking process in a short time.

According to an advantageous modification to the invention, provision is made for a preparation button. When said button is actuated, the desire of the driver to carry out the overtaking process is detected. By actuating the preparation button, the driver can thus communicate his/her desire to overtake a vehicle travelling ahead and thereby to actively transfer the drive device into the desired state. The preparation button can be virtually provided by means of a digital display or can be provided by means of a switch that is to be actuated mechanically.

Provision is preferably made for the request to carry out the overtaking process to be dependent on the driving behavior of a driver. In contrast to the preparation button, the driving behavior of the driver is monitored and a decision is made as a function thereof whether the driver would like to carry out an overtaking process or not. In this case, it is no longer necessary for the driver to explicitly express the request. This simplifies carrying out the method and considerably increases the driving comfort of the driver.

Provision is made according to a preferred modification to the invention for a steering angle, the torque request and/or a manual transmission to be monitored for a change in order to determine the driving behavior of the driver. If, for example, the driver changes the steering angle and shifts into a lower gear but the torque request nevertheless increases, it is preferably assumed that the driver would shortly like to carry out an overtaking process. In a particularly preferred manner, provision is made for a blinker respectively a signal device of the vehicle that can be actuated to be alternatively or additionally monitored. If the driver actuates the blinker and thereby places a signal for overtaking a vehicle travelling ahead, step c) of the method according to the invention is preferably automatically executed. In a particularly preferred manner, the preparation button is designed to be integrated into the selector lever of the blinker.

Provision is made according to a preferred embodiment of the invention for the current and/or upcoming road section and the maximum permitted speed in each case to be determined by means of a navigation system, wherein the drive device is only then actuated according to step c) if the speed of the road user lies below the respective maximum speed limit. As a function of the current position of the vehicle, the current and/or upcoming road section can be examined with the aid of the navigation system for the respective maximum speed limit permitted there. This requires that corresponding values are deposited in the map data of the navigation system. If it is detected that the speed of the road user who is to be overtaken corresponds to the respective maximum speed limit or even exceeds said limit, the drive device is not prepared according to step c) but instead a warning is preferably outputted that the overtaking process should not be carried out. The warning signal is preferably visually, optically or acoustically outputted.

According to a preferred modification to the invention, provision is alternatively or additionally made for the upcoming road section to be checked for the suitability of carrying out the requested overtaking process. In so doing, a check is particularly made as to whether the upcoming road section has tight curves or only short straightaways, which could represent a risk for the overtaking process. Only if it is determined that the upcoming road section is suitable for an overtaking process, is step c) carried out.

In addition, provision is preferably made for oncoming traffic on the roadway to be monitored by a surroundings sensor system and for step c) to only then be carried out if no oncoming traffic is detected. If the surroundings sensor system, which comprises one or a plurality of sensors, in particular ultrasonic, infrared and/or camera sensors, detects that no oncoming road users are present on the roadway, step c) is carried out and the drive device is prepared for the overtaking process.

Provision is furthermore made upon initiating the overtaking process for the electric machine to be switched into a no-load operation or into a motor mode for supporting the internal combustion engine during the overtaking process. As soon as the system detects that the prepared overtaking process is now actually being initiated, the negative torque of the electric machine is withdrawn so that the torque of the internal combustion engine is no longer compensated and the torque of the internal combustion engine that is available can completely be used to drive the vehicle. In a particularly preferred manner, the electric machine is switched into a motor mode; thus enabling said electric machine to likewise deliver a positive torque and to thereby support the internal combustion engine.

The initiation of the overtaking process is preferably detected as a function of a change in the torque request, in particular of a change in the gas pedal position. If the drive device is located according to step c) in the prepared state thereof, the detecting of an increased torque request or, respectively, a correspondingly changed gas pedal position signifies that the overtaking process is now to be initiated. The electric machine is then accordingly switched out of the generator mode into the no-load operation or into the motor mode.

The device according to the invention having the features of claim 11 comprises a surroundings sensor system for monitoring the roadway for road users travelling ahead, a state sensor system for detecting a request of the driver to carry out an overtaking process of a detected road user travelling ahead and a control device which actuates the drive device to prepare an overtaking maneuver if a request for carrying out an overtaking process has been detected in such a way that a torque reserve of the internal combustion engine is built up particularly while maintaining a current rotational speed. The advantages already previously mentioned ensue as a result. If the drive device comprises at least one electric machine as a further drive machine, which is operatively connected to the internal combustion engine, the control device preferably controls the drive device for building up the torque reserve in such a way that the electric machine is switched into a generator mode and a torque of the internal combustion engine is increased in order to maintain the requested drive torque. The maintenance of the requested drive torque ensures that the current rotational speed of the internal combustion engine is maintained. The rotational speed is correspondingly increased only with the initiation of the overtaking process. In a particularly preferred manner, the state sensor system comprises a preparation button. The request for carrying out the overtaking process is detected when said button is actuated, as previously described. The preparation button is preferably designed as described above. Alternatively or additionally, the state sensor system comprises means which detect the driving behavior of the driver, in particular by monitoring an angle of steering lock, a gas pedal position and/or a shift position of a manual transmission of the vehicle in order to carry out the method described above when required.

BRIEF DESCRIPTION OF THE DRAWINGS

The invention is described below in greater detail on the basis of an exemplary embodiment. To this end, the only FIGURE shows a vehicle on a roadway in a simplified depiction.

DETAILED DESCRIPTION

The FIGURE shows a road situation comprising a vehicle 1 which is driven by a driver on a roadway and a road user 3 who is travelling ahead on the same roadway and is moving in the same direction as the vehicle 1. The vehicle 1 and the road user 3 are motor vehicles in the present exemplary embodiment. The roadway 2 has two lanes, wherein the vehicle 1 and the further road user 3 are situated in the right lane respectively right traffic lane, whereas the other traffic lane is provided for the oncoming traffic.

The vehicle 1 has a drive device 20, which comprises an internal combustion engine 21 and an electric machine 22 operatively connected to the internal combustion engine 21, which together generate a drive torque for driving the vehicle 1.

The vehicle 1 further comprises a device 4 which transfers the vehicle into a preparation state (overtaking mode) if it is detected that the driver would like to carry out an overtaking process for overtaking the road user 3. In order to transfer the vehicle into the preparation state, the electric machine 22 is switched into a generator mode and the torque of the internal combustion engine 21 is simultaneously increased, so that the original drive torque, which is generated collectively by the internal combustion engine 21 and the electric machine 22, continues to be available and simultaneously a torque reserve is built up in said internal combustion engine. The increased torque of the internal combustion engine 21 is therefore compensated by the generator mode of the electric machine 22. As a result, the high torque of the combustion engine 21 is already available to the driver upon initiation of the overtaking process, so that the time which the internal combustion engine 21 would usually require to build up the torque is no longer necessary. If the driver eventually initiates the overtaking process, only the generator operation of the electric machine 22 is ended and said electric machine is switched to a motor mode for supporting the internal combustion engine 21; thus enabling a high torque to be provided to the driver within the shortest amount of time, said torque making the overtaking process easier for the driver and thus said overtaking process is designed in a safer and more reliable fashion.

The device 4 has a surroundings sensor system 5 for this purpose. The surroundings sensor system 5 has a plurality of surroundings sensors 6 available which are disposed on the front side of the vehicle so as to be spaced apart from one another in order to scan the upcoming road section for road users 3 or other obstacles. The surroundings sensors 6 can, for example, be designed as radar sensors, infrared sensors or camera sensors. The surroundings sensor system 5 furthermore comprises a control unit 7 which evaluates the data acquired by the surroundings sensors 6.

The device 4 further comprises a state sensor system 8 which monitors the driving behavior of the driver. The state sensor system 8 has, for example, a sensor for acquiring the steering angle, the gas pedal position and/or a gearbox setting or rather is connected to corresponding sensors or control units in order to detect the steering angle, the gas pedal position and/or the gearbox setting. It is also conceivable that the state sensor system 8 furthermore has a camera device which detects the driver as well as his/her movements, in particular his/her eye movements. As a function of the data acquired in this manner, the state sensor system 8 detects whether the driver would like to initiate an overtaking process. This is then, for example, the case if the system has detected that the driver has engaged a lower gear, simultaneously increases a torque request by a corresponding actuation of the gas pedal and changes the steering angle for overtaking a vehicle and/or actuates a blinker. The drive device 20 is preferably only then shifted into the preparation mode or overtaking mode if it has been detected by means of the surroundings sensor system that a road user travelling ahead exists who could be overtaken.

The device 4 furthermore comprises a GPS module 9 of a navigation system or, respectively, is connected to the same. On the basis of the data of the GPS module 9, it is determined where the vehicle 1 is located on a virtual road map. As a function of the current position, the upcoming road section of the vehicle 1 is checked as to whether said upcoming road section is suitable for overtaking the road user 3 travelling ahead. If this check reveals that the upcoming road section has tight curves or only short straight sections, a risk is detected for the overtaking maneuver and the system prevents the drive device 20 from switching into the overtaking mode.

The device 4 further comprises a control device 10 as a means for carrying out the check. The control device 10 acquires the data of the surroundings sensor system 7, of the state sensor system 8 as well as of the GPS module 9 and accordingly evaluates said data. If it is detected that the driver is initiating an overtaking maneuver and an overtaking process without risk is not possible, for example due to the potentially dangerous road section, the drive device 20 is then not transferred into the preparation state previously described or, respectively, is not prepared for overtaking the vehicle travelling ahead. Instead of this, a warning message is outputted if need be to the driver of the vehicle 1 by means of a signal device 11, which in the present embodiment is designed as a loud speaker. Alternatively, a warning signal can also be visually displayed, for example by correspondingly superimposing symbols, for example, in multipurpose instruments of the vehicle or visually displayed by means of a head-up display or something similar.

On the basis of the data of the GPS module 9, the currently allowed maximum speed on the road section of the roadway 2 on which the vehicle 1 and the road user 3 are located is determined. Provision can also alternatively be made for the current maximum speed limit to be determined by a camera system which detects and evaluates traffic signs situated along the side of the road. If the check reveals that the vehicle 1 or the road user 3 has already reached the allowed maximum speed, the drive device 20 is likewise not transferred into the preparation state. Instead of this, the warning signal is preferably outputted upon the overtaking process being initiated due to the fact that an overtaking process executed now would lead to the allowed maximum speed having to be exceeded by the vehicle 1.

A check is furthermore preferably made by the control device 10 particularly as a function of the current speed of the vehicle 1 and the data of the surroundings sensor system 5 as to whether an overtaking process can be efficiently executed. To this end, the speed of the relevant driver's vehicle 1 is compared to the speed of the road user 3 travelling ahead. The resulting speed difference is compared to a predeterminable threshold value. If the threshold value is undershot, the speed difference is too low to efficiently carry out a safe overtaking process. If the threshold value is exceeded, the overtaking process can thus be carried out sufficiently fast. A warning signal is preferably then outputted and/or the drive device 20 is left in the initial state thereof or, respectively, not switched into the preparation state if the speed difference is too small or if, despite a sufficiently high speed difference, another danger is present such as, for example, an unsuitable road section.

Provision is therefore made by the invention for the internal combustion engine 21 to be transferred into a preloaded or charged state having a torque reserve if a request of the driver for overtaking a vehicle travelling ahead has been detected by the state sensor system 8 and the accident sensor system 5 and preferably if the boundary conditions permit an overtaking process without risk. If a risk is detected, either the drive device 20 is not switched into the preparation state respectively into the overtaking mode or a warning signal, for example, is outputted instead.

As an alternative to the acoustic or visual outputting of the warning signal as was described earlier, it is also conceivable to haptically convey the warning signal to the driver. This can, for example, take place by means of a vibration generated in the steering wheel 2 of the vehicle, which leads to a haptic warning signal. It is also conceivable to increase the counter pressure of the gas pedal of the vehicle 1 in order to make the driver aware of a risk in carrying out an overtaking process.

In a particularly preferred manner, the device 4 comprises a preparation button 23 which can be actuated by the driver and is connected to the control device 10; thus enabling the drive device 20 to be automatically switched into the preparation mode or, respectively, the overtaking mode when the preparation button 23 is actuated. The preparation button 23 can be constituted by a virtual button of a digital display or can be designed as a switch that can be mechanically actuated. Provision is especially preferably made for the preparation button 23 to be disposed in the proximity of the steering wheel 12 and can thereby be easily reached by the driver at any time. Provision is particularly made for the preparation button 23, as in the present exemplary embodiment, to be integrated into a lever for actuating the blinker of the vehicle such that upon setting a blinker signal the drive device 20 is automatically transferred into the preparation state, provided the overtaking process, as previously described, can be carried out safely.

Alternatively to carrying out the method as described above, provision is made according to a further exemplary embodiment for the torque reserve to be built up by means of an adjustment of the ignition angle or an adjustment of the injection timing of the internal combustion engine.

The invention claimed is:

1. A method for operating a vehicle with a drive device (20) which has at least one internal combustion engine (21) as a drive machine, wherein a drive torque requested by a driver of the vehicle (1) is implemented by operating at least the internal combustion engine (21) on a roadway (2), comprising the following steps:
    a) Monitoring the roadway (2) for road users (3) travelling ahead by a surroundings sensor system (5),
    b) Monitoring a driver of the vehicle (1) by a state sensor system (8) with respect the driver's request to carry out an overtaking process in order to overtake a detected road user (3) travelling ahead, and if a request for carrying out an overtaking process has been detected,
    c) Actuating the drive device (20) to prepare the overtaking process such that, before the overtaking process is carried out, a torque reserve of the internal combustion engine (21) is built up.

2. The method according to claim 1, characterized in that, if the drive device (20) comprises at least one electric machine (22) as a further drive machine, the electric machine (22) is switched into a generator mode in step c) in order to build up the torque reserve and the torque of the internal combustion engine (21) is increased in order to maintain the requested drive torque.

3. The method according to claim 1, characterized in that a preparation button (23) is provided, the request for carrying out the overtaking process being detected when said button is actuated.

4. The method according to claim 1, characterized in that the request for carrying out the overtaking process is detected as a function of the driving behavior of a driver.

5. The method according to claim 1, characterized in that a steering angle, a torque request and/or a manual transmission are monitored with regard to a change in order to determine the driving behavior of the driver.

6. The method according to claim 1, characterized in that the current and/or upcoming road section and the maximum speed allowed in each case are determined by a navigation system (9) of the vehicle, wherein the drive device (23) is only actuated according to step c) if the speed of the road user (3) travelling ahead is less than the respective maximum speed.

7. The method according to claim 1, characterized in that an upcoming road section is checked for suitability for carrying out the requested overtaking process by the navigation system (9).

8. The method according to claim 1, characterized in that oncoming traffic is monitored on the roadway (2) by the surroundings sensor system (5) and in that step c) is only then carried out if no oncoming traffic is detected.

9. The method according to claim 1, characterized in that, when initiating the overtaking maneuver, the electric machine (22) is switched into a no-load operation in order to support the internal combustion engine (21) during the overtaking maneuver.

10. The method according to claim 1, characterized in that the initiation of the overtaking process is detected as a function of a gas pedal position.

11. The method according to claim 1, characterized in that, when initiating the overtaking maneuver, the electric machine (22) is switched into a motor mode in order to support the internal combustion engine (21) during the overtaking maneuver.

12. A device (4) for operating a vehicle, for carrying out the method according to claim 1 together with a drive device (20) which has at least one internal combustion engine (21) as a drive machine, wherein a drive torque requested by the driver of the vehicle is implemented by actuating at least the internal combustion engine (21) on a roadway (2), said device (4) comprising:
    a surroundings sensor system (5) for monitoring the roadway (2) regarding road users travelling ahead,
    a state sensor system (8) for detecting a request of the driver to carry out an overtaking process for overtaking a detected road user (3) travelling ahead,
    and a control device (10) which actuates the drive device (20) to prepare an overtaking maneuver if a request for carrying out an overtaking process has been detected in such a way that a torque reserve of the internal combustion engine (21) is built up.

* * * * *